United States Patent [19]

Sommargren

[11] Patent Number: 4,684,828
[45] Date of Patent: Aug. 4, 1987

[54] APPARATUS TO TRANSFORM A SINGLE FREQUENCY, LINEARLY POLARIZED LASER BEAM INTO A BEAM WITH TWO, ORTHOGONALLY POLARIZED FREQUENCIES

[75] Inventor: Gary E. Sommargren, Madison, Conn.

[73] Assignee: Zygo Corporation, Middlefield, Conn.

[21] Appl. No.: 710,859

[22] Filed: Mar. 12, 1985

[51] Int. Cl.⁴ ............................................... G02F 1/35
[52] U.S. Cl. ..................................... 307/425; 350/358
[58] Field of Search ........................ 307/425; 350/358

[56] References Cited

PUBLICATIONS

C. H. Claassen, "Efficiency Stabilization for Multi-Beam Acousto-Optic Modulators", IBM TDB, vol. 22, No. 5, Oct. 1979, p. 2073.

Primary Examiner—James W. Davie
Attorney, Agent, or Firm—Stiefel, Gross, Kurland & Pavane

[57] ABSTRACT

An electro-optical apparatus transforms a single stabilized frequency, linearly polarized laser input beam (18) from a light source (10) into an output beam (46) having two orthogonal polarization components of different frequency. The input beam (18) is provided to an acousto-optic Bragg cell (20) which is driven by the output of an electrical oscillator (30) which provides the Bragg cell (20) with a frequency stabilized electrical signal (32) comprised of two different frequencies. The Bragg cell (20) transforms the input beam (18) into two intermediate beams (40, 42) having the same linear polarization as the input beam (18) but whose directions of propagation and frequencies differ from the input beam (18) and which are at one-half the intensity of the input beam (18). The Bragg cell (20) output is provided to a birefringent prism (44) which splits the intermediate beams (40, 42) into the two orthogonal polarization components of the output beam (46), at one-half the intensity of the input beam (18), and two spurious beams (48, 50) which are eliminated.

33 Claims, 2 Drawing Figures

APPARATUS TO TRANSFORM A SINGLE FREQUENCY, LINEARLY POLARIZED LASER BEAM INTO A BEAM WITH TWO, ORTHOGONALLY POLARIZED FREQUENCIES

CROSS-REFERENCE TO RELATED APPLICATIONS

This application is related to the commonly owned U.S. patent applications entitled "Heterodyne Interferometer System" naming Gary E. Sommargren and Moshe Schaham as joint inventors thereof, U.S. Ser. No. 710,928, filed Mar. 12, 1985, "Apparatus to Transform a Single Frequency, Linearly Polarized Laser Beam Into a High Efficiency Beam With Two, Orthogonally Polarized Frequencies" naming Gary E. Sommargren as sole inventor thereof, U.S. Ser. No. 710,927, filed Mar. 12, 1985 and the contents of which are specifically incorporated by reference herein.

BACKGROUND OF THE INVENTION

1. Field of the Invention

The present invention relates to apparatus for transforming a single frequency, linearly polarized laser beam into a beam with two, orthogonally polarized frequencies. More particularly, the invention relates to electro-optical apparatus which is useful in a variety of optical measuring devices which perform extremely accurate measurement of changes in either length or optical length.

2. The Prior Art

The use of optical interferometry to measure changes in either length, distance, or optical length has grown significantly due not only to technological advances in lasers, photosensors, and microelectronics but also to an ever increasing demand for high precision, high accuracy measurements. The prior-art interferometers can be generally categorized into two types based on the signal processing technique used, i.e., either homodyne or heterodyne. The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies. In the prior-art, two-optical frequency heterodyne interferometers, the two optical frequencies are produced by one of the following techniques: (1) use of a Zeeman split laser, see for example, Bagley et al, U.S. Pat. No. 3,458,259 issued July 29, 1969; G. Bouwhuis, "Interferometrie Met Gaslasers," *Ned. T. Natuurk*, vol. 34, pp. 225–232 (August 1968); *Hewlett Packard Journal* (August 1970); Bagley et al., U.S. Pat. No. 3,656,853 issued April 18, 1972; *Hewlett-Packard Journal* (Apr. 1983); and H. Matsumoto, "Recent interferometric measurements using stabilized lasers," *Precision Engineering*, vol. 6, pp. 87–94 (Apr. 1984); (2) use of a pair of acousto-optic Bragg cells, see for example, Y. Ohtsuka and K. Itoh, "Two-frequency laser interferometer for small displacement measurements in a low frequency range," *Applied Optics*, vol. 18, pp. 219–224 (15 January 1979); N. Massie et al., "Measuring laser flow fields with a 64-channel heterodyne interferometer," *Applied Optics*, vol. 22, pp. 2141–2151 (1983); Y. Ohtsuka and M. Tsubokawa, "Dynamic two-frequency interferometry for small displacement measurements," *Optics and Laser Technology*, vol. 16, pp. 25–29 (February 1984); H. Matsumoto, *op.cit* or, (3) use of the two longitudinal modes of a randomly polarized HeNe laser, see for example, J. B. Ferguson and R. H. Morris, "Single Mode Collapse in 6328-A He-Ne lasers," *Applied Optics*, vol. 17, pp. 2924–2929 (1978).

The use of a Zeeman split laser to produce the two optical frequencies is only applicable to certain lasers (e.g., HeNe) and limits the frequency difference between the two optical frequencies to about 2 MHz. This imposes a limit on the maximum rate of change of the length or optical length being measured. In addition, the available power from a Zeeman split laser is less than 500 microwatts which can be a serious limitation when one laser source must be used for the measurement for multiple axes, e.g., 3–6 axes. Another limitation of the Zeeman split laser is that the frequency difference depends upon external applied magnetic fields which can vary with time, location, and orientation e.g., the earth's magnetic field or the magnetic fields produced by electrical currents in nearby electrical equipment. Therefore, it is necessary to measure this uncontrolled variability of the frequency difference in any measuring apparatus which relies on the constancy of the difference frequency.

The use of two Bragg cells to produce the two optical frequencies requires complex, expensive apparatus which is susceptible to a number of sources of error and alignment difficulties.

The use of two longitudinal modes of a randomly polarized HeNe laser provides a laser beam with two orthogonally polarized frequencies in a rather convenient, cost-effective form. However, the frequency difference is approximately 600–1000 MHz which requires complicated, expensive detection and processing electronics. Furthermore, by starting with such a high frequency difference, the task of resolution extension becomes difficult and expensive.

While prior-art techniques for producing a laser beam with two optical frequencies of orthogonal polarization are useful for some applications, none provide the technical performance in a commercially viable form for applications requiring the measurement of rapidly changing lengths (distances) to extremely high resolution.

SUMMARY OF THE INVENTION

In accordance with the instant invention, I provide electro-optical apparatus capable of transforming a single frequency, $f_L$, linearly polarized laser beam into a beam with two orthogonally polarized frequencies comprising: (1) a source of a stabilized single frequency, linearly polarized input beam, most preferably a laser; (2) means, most preferably a frequency stabilized electronic oscillator to provide two electrical signals of frequencies $f_1$ and $f_2$; (3) means, most preferably an electronic amplifier, for delivering said electrical signals to, (4) means, most preferably an acousto-optic Bragg cell, which transforms said input beam into two intermediate beams having a frequency difference $f_2 - f_1$, a small difference in the direction of propagation, the same polarization as the input beam and each having approximately one-half the intensity of the input beam; (5) means, most preferably a birefringent prism, which splits each of said intermediate beams into two orthogonally polarized beams to produce an output beam and two spurious beams, said output beam having one-half the intensity of said input beam, two orthogonal polarization components, and a frequency difference $f_2 - f_1$ between the two orthogonal polarization components and said spurious beams having directions of propagation deviated by a small angle to that of said input beam and each having one-quarter the intensity of said input beam; and (6) means, most preferably opaque stops, for eliminating said spurious beams.

THE DRAWINGS

DETAILED DESCRIPTION OF THE INVENTION

Figure 1:
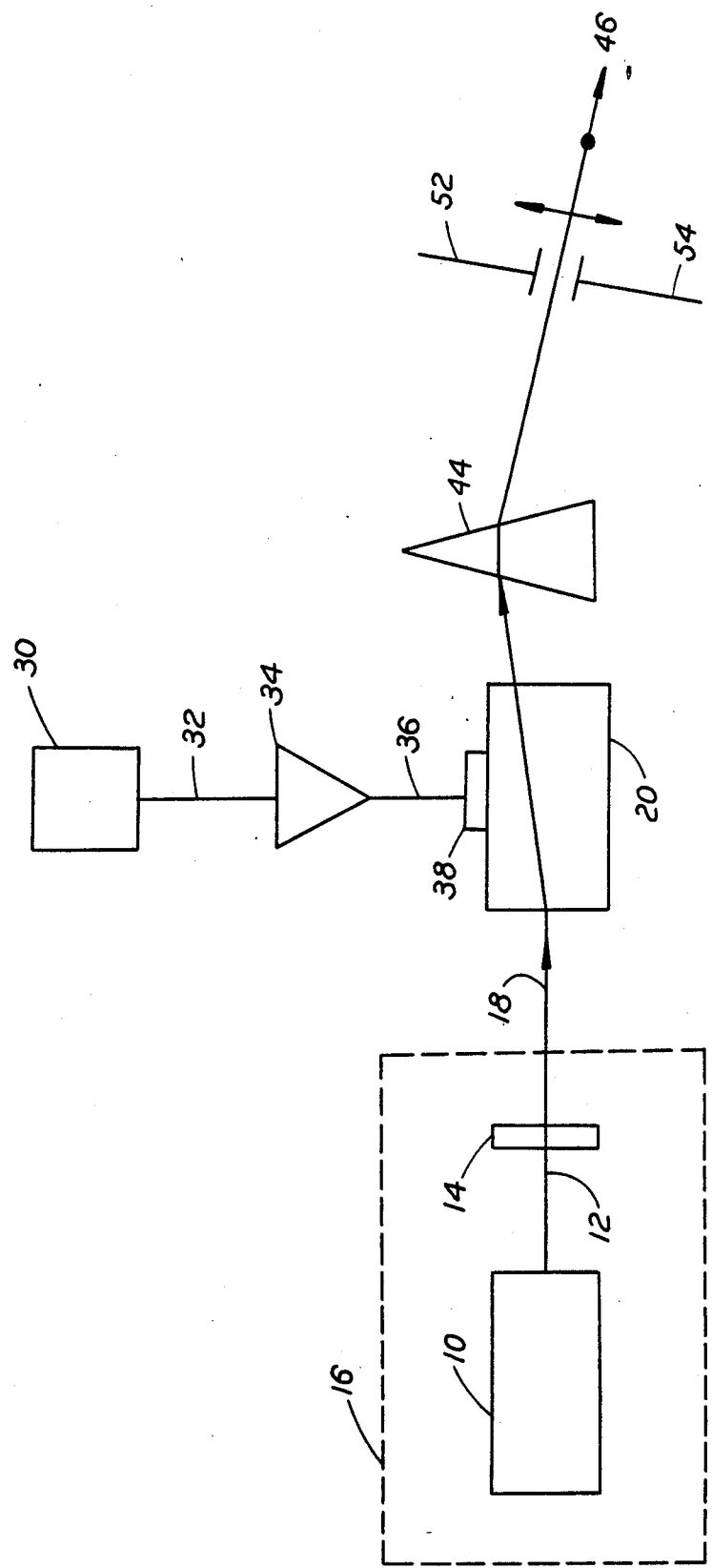
FIG. 1 depicts in schematic form an embodiment of the instant invention.
Figure 2:
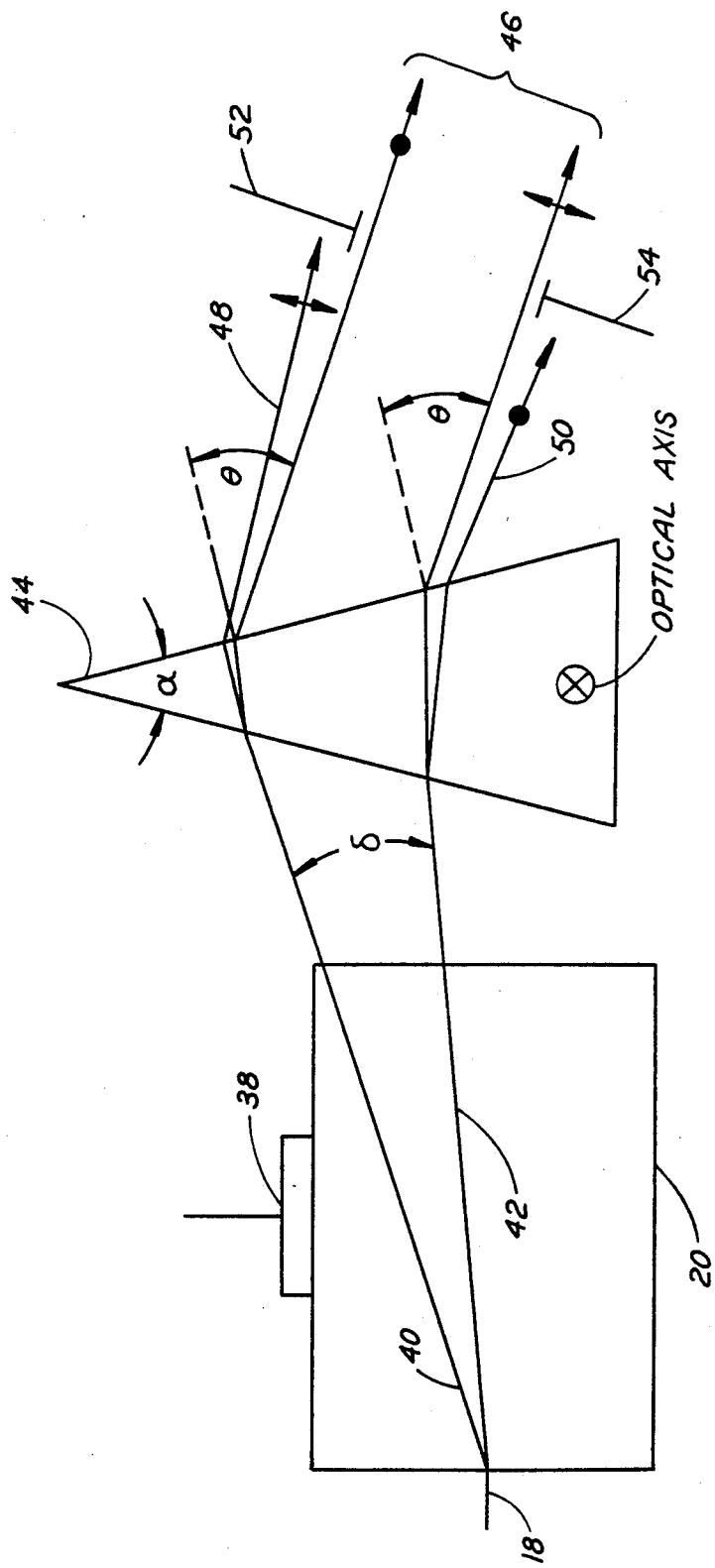
FIG. 2 depicts in schematic form the detailed propagation of the light beams through the birefringent prism.

FIG. 1 depicts in schematic form a presently preferred embodiment of the instant invention. While the apparatus has application for a wide range of radiation sources, the following description is taken by way of example with respect to an optical measuring system. The term "radiant energy" as used herein includes, but is not limited to, electromagnetic energy of all frequency ranges. A light source (10), most preferably a laser, provides a beam (12) of optical energy which has a single, stabilized frequency and is linearly polarized. Light source (10) can be any of a variety of lasers. For example, it can be a gas laser, e.g. a helium-neon gas laser, stabilized in any of a variety of conventional techniques known to those skilled in the art to produce beam (12), see for example, T. Baer et al., "Frequency stabilization of a 0.633 μm He-Ne longitudinal Zeeman laser," *Applied Optics*, vol. 19, pp. 3173-3177 (1980); Burgwald et al., U.S. Pat. No. 3,889,207 issued June 10, 1975; and Sandstrom et al., U.S. Pat. No. 3,662,279 issued May 9, 1972. Alternatively, light source (10) can be a diode laser frequency stabilized in one of a variety of techniques known to those skilled in the art to produce beam (12), see for example, T. Okoshi and K. Kikuchi, "Frequency Stabilization of Semiconductor Lasers for Heterodyne-type Optical Communication Systems" *Electronic Letters*, Vol. 16, pp. 179-181 (1980) and S. Yamaguchi and M. Suzuki, "simultaneous Stabilization of the Frequency and Power of an AlGaAs Semiconductor Laser by Use of the Optogalvanic Effect of Krypton," *IEEE J. Quantum Electronics*, Vol. QE-19, pp. 1514-1519 (1983). The specific device used for source (10) will determine the diameter and divergence of beam (12). For some sources, e.g., a diode laser, it is necessary to use beam forming optics (14), e.g. a microscope objective, to provide an input beam (18) with a suitable diameter and divergence for the elements that follow. When source (10) is a helium-neon laser, for example, beam forming optics (14) may not be required. The elements (10) and (14) are shown in a dashed box (16) which is the source of the input beam (18) which has one stabilized frequency $f_L$ and is linearly polarized. The polarization orientation, by way of example, is preferably 45° to the plane of the figure. Electrical oscillator (30) provides a frequency stabilized electrical signal (32) comprised of frequencies $f_1$ and $f_2$ to the power amplifier (34). The electrical output (36) of power amplifier (34) is used to drive the piezoelectric trans-ducer (38) affixed to the acousto-optical Bragg cell (20). FIG. 2 depicts in schematic form the detailed propagation of input beam (18) through the acousto-optical Bragg cell (20) and the birefringent prism (44). Bragg cell (20) transforms the input beam (18) into two intermediate beams (40) and (42). While the linear polarization of beams (40) and (42) are the same as input beam (18), their directions of propagation and frequencies differ from those of input beam (18). In particular, the direction of propagation of beam (40) is deviated by a small angle, δ, from that of (42). In addition, the frequency $f_L + f_2$ of beam (40) differs from the frequency $f_L + f_1$ of beam (42) by an amount equal to $f_2 - f_1$, i.e., the difference of drive frequencies of the Bragg cell (20). The electrical output (36) of power amplifier (34) is adjusted so that beams (40) and (42) have approximately the same intensity which is approximately one-half that of input beam (18). Beams (40) and (42) are incident on birefringent prism (44) which is made of a crystal (e.g. quartz) with the optical axis parallel to the apex edge. The apex angle, α is chosen to satisfy the equation $$\delta = \sin^{-1}\left[n_o \sin\left(\alpha - \sin^{-1}\left(\frac{\sin\theta}{n_o}\right)\right)\right] - \sin^{-1}\left[n_e \sin\left(\alpha - \sin^{-1}\left(\frac{\sin\theta}{n_e}\right)\right)\right]$$

where $n_o$ and $n_e$ are the ordinary and extraordinary indices of refraction, respectively and θ is the exit angle of the output beam (46). Birefringent prism (44) acts on intermediate beam (40) and (42) to split each into two orthogonally polarized beams, one parallel and one perpendicular to the plane of the figure, to produce an output beam (46) and two spurious beams (48) and (50). The output beam (46) has two orthogonal polarization components, and has a frequency difference $f_2 - f_1$ between the two orthogonal polarization components. The spatial separation of the polarization components is minute, only a small fraction of the beam diameter. It is illustratively shown greatly exaggerated in the figure. Spurious beams (48) and (50) have directions of propagation different from output beam (46) so that they can be eliminated by opaque stops (52) and (54). The function of blocking spurious beams (48) and (50) could, alternatively, be performed using a conventional pin hole spatial filter arrangement.

In some instances, where the desired frequency shift is 20 MHz or greater, the present invention may be simplified by eliminating $f_1$ in electrical signal (32) (i.e., $f_1 = 0$) causing beam (42) to have the same direction of propagation and frequency as input beam (18) but otherwise not altering the operation of the invention.

The principal advantages of the instant invention are: (1) higher, selectable frequency difference between the two orthogonally polarized components of the output beam, e.g., a tunable frequency range of 2-150 MHz vs. 0.6-2 MHz for a Zeeman split laser source, (2) higher output intensity, (3) the frequency difference is insensitive to external magnetic fields, and (4) independence of the two frequency forming apparatus from the laser source, i.e., the instant invention can be used with either gas lasers or diode lasers.

While a preferred embodiment of the invention has been disclosed, obviously modification can be made therein, without departing from the spirit or scope of the invention as defined in the following claims.

What is claimed is:

1. An electro-optical apparatus comprising a light source for providing a linearly polarized single stabilized first frequency optical input beam having an associated intensity; means for providing second and third frequency stabilized electrical signals respectively; means connected to both said input beam providing means and said electrical signal providing means for transforming said input beam into first and second intermediate beams having a frequency difference based on the difference between said second and third stabilized frequencies and having the same linear polarization as said input beam, each of said intermediate beams having approximately one half of said input beam associated intensity; and means optically connected to said transforming means for converting said intermediate beams into an output beam having two orthogonal polarization components having a frequency difference between said components corresponding to said intermediate beam frequency difference.

2. An apparatus in accordance with claim 1 wherein said output beam has approximately one-half the intensity of said input beam.

3. An apparatus in accordance with claim 1 wherein said conversion means comprises a birefringent prism.

4. An apparatus in accordance with claim 3 wherein said birefringent prism comprises means for splitting said intermediate beams into said two orthogonally polarized beams to produce said output beam and two spurious beams, said spurious beams having directions of propagation different from said input beam and each having one quarter the intensity of said input beam; and said apparatus further comprises means optically connected to said birefringent prism for eliminating said spurious beams.

5. An apparatus in accordance with claim 4 wherein said spurious beam eliminating means comprises opaque stops.

6. An apparatus in accordance with claim 4 wherein said spurious beam eliminating means comprises a pin hole spatial filter means.

7. An apparatus in accordance with claim 2 wherein said conversion means comprises a birefringent prism.

8. An apparatus in accordance with claim 1 wherein said light source comprises a laser, said input beam being a laser beam.

9. An apparatus in accordance with claim 8 wherein said transforming means comprises an acousto-optic Bragg cell.

10. An apparatus in accordance with claim 9 wherein said electrical signal providing means comprises a frequency stabilized oscillator.

11. An apparatus in accordance with claim 10 wherein said electrical signal providing means further comprises a power amplifier electrically connected between said oscillator and said transforming means for driving said Bragg cell.

12. An apparatus in accordance with claim 11 wherein said conversion means comprises a birefringent prism.

13. An apparatus in accordance with claim 12 wherein said birefringent prism comprises means for splitting said intermediate beams into said two orthogonally polarized beams to produce said output beam and two spurious beams, said spurious beams having directions of propagation different from said input beam and each having one quarter the intensity of said input beam; and said apparatus further comprises means optically connected to said birefringent prism for eliminating said spurious beams.

14. An apparatus in accordance with claim 8 wherein said output beam has one-half the intensity of said input beam.

15. An apparatus in accordance with claim 14 wherein said transforming means comprises an acousto-optic Bragg cell.

16. An apparatus in accordance with claim 15 wherein said electrical signal providing means comprises a frequency stabilized oscillator.

17. An apparatus in accordance with claim 8 wherein said laser comprises a helium neon gas laser.

18. An apparatus in accordance with claim 8 wherein said laser comprises a diode laser.

19. An apparatus in accordance with claim 18 wherein said light source further comprises beam forming optics associated with said diode laser for providing said input beam.

20. An apparatus in accordance with claim 1 wherein said input beam, has a 45° polarization orientation to the longitudinal axis of propagation.

21. An apparatus in accordance with claim 1 wherein said transforming means comprises an acousto-optic Bragg cell.

22. An apparatus in accordance with claim 21 wherein said electrical signal providing means comprises a frequency stabilized oscillator.

23. An apparatus in accordance with claim 22 wherein said electrical signal providing means further comprises a power amplifier electrically connected between said oscillator and said transforming means for driving said Bragg cell.

24. An apparatus in accordance with claim 3 wherein said birefringent prism has an apex edge with the optical axis parallel to said apex edge and having an apex angle $\alpha$ which satisfies the expression $$\delta = \sin^{-1}\left[n_o\sin\left(\alpha - \sin^{-1}\left(\frac{\sin\theta}{n_o}\right)\right)\right] - \sin^{-1}\left[n_e\sin\left(\alpha - \sin^{-1}\left(\frac{\sin\theta}{n_e}\right)\right)\right]$$

where $\delta$ is the angle of deviation in the direction of propagation between said intermediate beams, $n_o$ and $n_e$ are the ordinary and extraordinary indices of refraction, respectively and $\theta$ is the exit angle of said output beam.

25. An apparatus in accordance with claim 24 wherein said birefringent prism comprises means for splitting said intermediate beams into said two orthogonally polarized beams to produce said output beam and two spurious beams, said spurious beams having directions of propagation different from said input beam and each having one quarter the intensity of said input beam; and said apparatus further comprises means optically connected to said birefringent prism for eliminating said spurious beams.

26. An apparatus in accordance with claim 12 wherein said birefringent prism has an apex edge with the optical axis parallel to said apex edge and having an apex angle $\alpha$ which satisfies the expression $$\delta = \sin^{-1}\left[n_o\sin\left(\alpha - \sin^{-1}\left(\frac{\sin\theta}{n_o}\right)\right)\right] -$$

-continued $$\sin^{-1}\left[n_e\sin\left(\alpha - \sin^{-1}\left(\frac{\sin\theta}{n_e}\right)\right)\right]$$

where $\delta$ is the angle of diviation in the direction of propagation between said intermediate beams, $n_o$ and $n_e$ are the ordinary and extraodinary indices of refraction, respectively and $\theta$ is the exit angle of said output beam.

27. An apparatus in accordance with claim 7 wherein said birefringent prism bas an apex edge with the optical axis parallel to said apex edge and having an apex angle $\alpha$ which satisfies the expression $$\delta = \sin^{-1}\left[n_o\sin\left(\alpha - \sin^{-1}\left(\frac{\sin\theta}{n_o}\right)\right)\right] -$$

$$\sin^{-1}\left[n_e\sin\left(\alpha - \sin^{-1}\left(\frac{\sin\theta}{n_e}\right)\right)\right]$$

where $\delta$ is the angle of deviation in the direction of propagation between said intermediate beams, $n_o$ and $n_e$ are the ordinary and extraordinary indices of refraction, respectively and $\theta$ is the exit angle of said output beam.

28. An electro-optical apparatus comprising: a light source for providing a linearly polarized single stabilized first frequency optical input beam having an associated intensity;

means for providing at least a second frequency stabilized electrical signal;

means connected to both said input providing means and said electrical signal providing means for transforming said input beam into first and second intermediate beams having a frequency difference of at least 20 MHz, said first intermediate beam having the same direction of propagation and frequency as said input beam, said intermediate beams having the same linear polarization as said input beam and each having approximately one half said input beam associated intensity; and means optically connected to said transforming means for converting each of said intermediate beams into an orthogonally polarized beam for providing an output beam having two orthogonal polarization components having a frequency difference between said components corresponding to said intermediate beam frequency difference.

29. An apparatus in accordance with claim 28 wherein said output beam has one-half the intensity of said input beam.

30. An apparatus in accordance with claim 28 wherein said conversion means comprises a birefringent prism.

31. An apparatus in accordance with claim 28 wherein said light source comprises a laser, said input beam being a laser beam.

32. An apparatus in accordance with claim 31 wherein said transforming means comprises an acousto-optic Bragg cell.

33. An apparatus in accordance with claim 32 wherein said electrical signal providing means comprises a frequency stabilized oscillator.

* * * * *